United States Patent
Bleifuss (10) Patent No.: US 10,947,054 B2
(45) Date of Patent: Mar. 16, 2021

(54) MODULARLY CONSTRUCTED CONVEYING SYSTEM HAVING DYNAMICALLY VARIABLE MODULE CONVEYING SPEEDS

(71) Applicant: SSI Schäfer Automation GmbH (DE), Giebelstadt (DE)

(72) Inventor: Ralf Bleifuss, Thüngersheim (DE)

(73) Assignee: SSI Schäfer Automation GmbH (DE), Giebelstadt (DE)

( * ) Notice: Subject to any disclaimer, the term of this patent is extended or adjusted under 35 U.S.C. 154(b) by 0 days.

(21) Appl. No.: 16/771,287

(22) PCT Filed: May 24, 2019

(86) PCT No.: PCT/EP2019/063462
§ 371 (c)(1),
(2) Date: Jun. 10, 2020

(87) PCT Pub. No.: WO2019/224352
PCT Pub. Date: Nov. 28, 2019

(65) Prior Publication Data
US 2020/0377304 A1    Dec. 3, 2020

(30) Foreign Application Priority Data

May 24, 2018   (DE) ..................... 10 2018 112 524.0

(51) Int. Cl.
*B65G 37/02* (2006.01)
*B65G 43/10* (2006.01)
*G06Q 10/08* (2012.01)

(52) U.S. Cl.
CPC ............. *B65G 37/02* (2013.01); *B65G 43/10* (2013.01); *G06Q 10/087* (2013.01)

(58) Field of Classification Search
CPC ....... B65G 37/02; B65G 43/10; G06Q 10/087
See application file for complete search history.

(56) References Cited

U.S. PATENT DOCUMENTS 7,613,542 B2 * 11/2009 Ko .................... B65G 43/00
                                                          198/572
8,965,567 B2 *  2/2015 Baier ................ G05B 19/4189
                                                          700/230
(Continued)

FOREIGN PATENT DOCUMENTS

DE    10 2009 031 137 A1    10/2010
DE    10 2010 006 093 A1     8/2011
(Continued)

OTHER PUBLICATIONS

International Search Report and Written Opinion for corresponding International Patent Application No. PCT/EP2019/063462 dated Jul. 8, 2019.
(Continued)

*Primary Examiner* — Gene O Crawford
*Assistant Examiner* — Keith R Campbell
(74) *Attorney, Agent, or Firm* — Renner, Otto, Boisselle & Sklar, LLP (57) ABSTRACT

A conveying system and method including a conveying network and controller for transporting according to transport orders during a time-frame having a fixed duration. Each good has allocated one of different conveying criteria and one of the transport orders. The conveying network includes an entry station, an exit station, and transport paths therebetween. Each transport path is operable during each operation-mode phase in one of different operation modes, which are distinguished by constant transport-path velocities. Each operation mode has allocated, based on one of the conveying criteria, one of the transport-path velocities. The time-frame is defined by several subsequent operation-mode phases. The controller selects the operation modes for the transport paths based on the conveying criteria such that
(Continued)

throughput of the convoying goods through the conveying network during the time-frame is optimized.

12 Claims, 6 Drawing Sheets

(56) References Cited

U.S. PATENT DOCUMENTS

| | | | |
|---|---|---|---|
| 9,382,077 B2* | 7/2016 | Scholler | B65G 47/681 |
| 9,994,400 B2* | 6/2018 | Solana | B65G 37/02 |
| 2009/0099686 A1* | 4/2009 | Yoshikawa | B65G 37/02 |
| | | | 700/228 |

FOREIGN PATENT DOCUMENTS

| | | |
|---|---|---|
| DE | 10 2014 221 325 A1 | 4/2016 |
| FR | 2 991 976 A1 | 12/2013 |
| WO | 2011/091880 A1 | 8/2011 |

OTHER PUBLICATIONS

German Office Action and translation for corresponding German Patent Application No. 10 2018 112 524.0 dated Feb. 4, 2019.

* cited by examiner

| OPERATION MODE | CRITERION 28 | VELOCITY 30 |
|---|---|---|
| 26-1 | $m < 3$ kg | 0,6 m/s |
| 26-2 | $3$ kg $\leq m < 5$ kg | 0,4 m/s |
| 26-3 | $5$ kg $\leq m$ | 0,2 m/s |

Fig. 4

| CONVEYING GOOD 34 | MASS | WEIGHT | DIMENSION | ... | CRITERION |
|---|---|---|---|---|---|
| #1 | m1 | G1 | A1 | ... | 28-1 |
| #2 | m2 | G2 | A2 | ... | 28-3 |
| ⋮ | ⋮ | ⋮ | ⋮ | ⋮ | ⋮ |
| #n | mn | Gn | An | ... | 28-2 |

CONVEYING-GOODS PROPERTIES  32

Fig. 5

| TRANSPORT ORDER 36 | CONVEY- ING GOOD | CRITERION | STARTING POINT | ARRIVAL POINT | ... |
|---|---|---|---|---|---|
| #1 | 34-1 | 28-1 | 16-1 | 18-1 | ... |
| #2 | 34-2 | 28-3 | 16-2 | 18-3 | ... |
| ⋮ | ⋮ | ⋮ | ⋮ | ⋮ | ⋮ |
| #n | 34-n | 28-2 | 16-3 | 18-1 | ... |

Fig. 6

| TRANSPORT ORDER 36 | ... | TRANSPORT PATH 20 | OM PHASE 38 |
|---|---|---|---|
| #1 | ... | (20-1)? | #? |
| #2 | ... | (20-2)? | #? |
| ⋮ | ... | ⋮ | ⋮ |
| #n | ... | ? | ? |

Fig. 7

| CONVEYING LINE 24 | OM PHASE 38-1 | OM PHASE 38-2 | ... | OM PHASE 38-K |
|---|---|---|---|---|
| #1 | 26-1 or  28-1 or  max. 0,2 m/s | 26-1 | ... | 26-3 |
| ⋮ | ⋮ | ⋮ | ... | ⋮ |
| #I | 26-4 or  0 m/s | 26-4 or  0 m/s | ... | 26-4 or  0 m/s |
| ⋮ | ⋮ | ⋮ | ... | ⋮ |
| #j | 26-3 | 26-1 | ... | 26-2 |

TIME FRAME

MODULARLY CONSTRUCTED CONVEYING SYSTEM HAVING DYNAMICALLY VARIABLE MODULE CONVEYING SPEEDS

This application is a national phase of International Patent Application No. PCT/EP2019/063462 filed on May 24, 2019, which claims priority to German Patent Application No. 10 2018 112 524.0 filed on May 24, 2018, all of which are hereby incorporated herein by reference.

The present invention relates to a conveying system including a conveying network and a control device. Further, the invention relates to a method for transporting conveying goods in a throughput-optimized manner.

Throughput optimization is generally expressed by transporting as much as possible conveying goods via as few as possible conveying lines through a conveying network within a time as short as possible.

The document DE 10 2014 221 325 A1 discloses a logistics system.

The document FR 2 991 976 A1 discloses a conveying system for moving loads comprising conveying elements being connected to a computer system for providing higher information and inquiry-return information, wherein the higher information includes routing and inquiry information.

The document DE 10 2010 006 093 A1 discloses a method for establishing, or for updating, routing tables for a modular conveying system as well as a modular conveying system.

The document 10 2009 031 137 A1 discloses a system for a de-centralized material-flow control.

In general, conveying systems serve for overcoming distances. Conveying and transporting systems convey transporting and conveying goods from entry stations (sources of a logistics network) to exit stations (sinks of the logistics network). The transporting and conveying goods can be bulk goods or piece goods. The invention particularly relates to the transport of piece goods (commodities, articles, cases, etc.). The piece goods can be transported with or without load supports (such as containers, trays, pallets, overhead-conveyor pockets).

For designers, manufacturers, and operators of transporting and conveying system the following transportation task results from a general logistics task (the right conveying good has to be at the right place at the right time): "A transporting system has to be configured, dimensioned, organized, and designed such that a certain conveying demand is optimally provided, wherein spatial, temporal, and technical constraints are taken into account."

The configuring includes a selection of technically suitable transporting means as well as the assembly of the transporting means to form a transporting and conveying network. The dimensioning is performed by determining positions and lengths of the transport paths (i.e. one or more transporting means belonging together) as well as performance indices of the transporting means. The organizing means generating the concept, and constructing a transport control. The disposing regulates the utilization of the transporting means in accordance with suitable transport strategies.

The locations, or positions, of the entry stations, intermediate stations and exit stations, which are to be connected to each other, are spatial constraints. Temporal constraints are, e.g., compulsory fetch times, required arrival times, or transport times permissible at maximum. Technical constraints result from the state of the transport good (e.g., weight, size, fragility, etc.), from the capacity of the transporting means (e.g., minimum distance of conveying goods or smallest possible separation, maximum line load, maximum individual load, maximum conveying velocity, etc.), and from a throughput capability of the transport lines and transport nodes (stations), cf. "Logistik" by Timm Gudehus (ISDN 3-540-65206), Springer Verlag, 1st edition, 1999, chapter 18, page 663 ff.

Hitherto, conveying lines of a conventional conveying network have been designed for a highest-possible capacity (selection of components such as drive, conveying means, etc.) and parameterized (e.g., conveying velocity). This is to be explained by means of the following example.

The (modular) conveying lines of a conventional conveying network can be operated at two velocities (e.g., 0.566 m/s and 0.278 m/s). At the velocity of 0.566 m/s the conveying lines can be operated at a maximum line load of, for example, 10 kg/m with a maximum individual load of the conveying goods of 4.5 kg. At the velocity of 0.278 m/s the conveying lines can be operated with a maximum line load of, for example, 25 kg/m with a maximum individual load of 12.5 kg. Now, if one biggest individual load of a conveying good for a spectrum of different conveying goods, which are to be transported sometimes, is 12.5 kg, the entire conveying network, i.e. each of the conveying lines, is operated at a velocity of 0.278 m/s at maximum. Additionally, since the maximum permissible line load is 25 kg/m, the conveying goods are transported at a minimum distance of conveying goods, i.e. smallest separation T possible, of 0.5 m. With this parameterization of the conveying lines the conveying network can always be operated safely. However, in this case the throughput can be limited to 2,000 conveying goods (velocity×1 h/d=0.278×3600/0.5=2.000). If it is additionally required to transport 380,000 conveying goods within 10 hours, then 19 conveying-line modules parallel to each other need to be provided.

However, it is desirable to use less conveying-line modules with the same throughput. Alternatively, it is desirable to achieve a higher throughput with the same number of conveying-line modules. Additionally, it is desirable to design a conveying network such that it can even handle higher throughputs predicted for the future with as few as possible existing conveying lines.

Therefore, it is an object of the present invention to provide an improved conveying system and a better method for transporting a plurality of conveying goods.

This object is solved by a conveying system including a conveying network and a control device for transporting through the conveying network a plurality of conveying goods in accordance with conveying-good specific transport orders during a time frame having a fixed duration, wherein one of several different conveying criteria and one of the transport orders are allocated to each of the conveying goods, wherein the conveying network comprises an entry station, an exit station, and several transport paths, wherein each of the transport paths connects the entry station to the exit station, wherein each of the transport paths, during each operation-mode phase, is operable in one of several different operation modes, wherein the operation modes distinguish from each other in constant transport-path velocities, wherein respectively one of the transport-path velocities is allocated to each of the operation modes based on one of the conveying criteria, and wherein the time frame is defined by several subsequent operation-mode phases, wherein the operation modes are selected, by the control device, for each of the transport paths based on the conveying criteria, which are allocated to the allocated conveying goods, respectively for one of the operation-mode phases such that throughput of the conveying goods through the conveying network is optimized during the time frame.

One advantage of the invention is to be seen in the flexibilization. Operators of such systems can work in a throughput-optimized manner. Few conveying lines are required for achieving high throughputs. Alternatively, some conveying lines can be deactivated resulting in less wear and less maintenance costs. The operator can immediately react on changing order structures.

Further advantages of the systems are: minimized capital costs upon preservation of the flexibility (long-term effects by saving additional conveying lines, in particular logistics functions); minimized running costs (maintenance, inspection, energy consumption); utilization of homogeneous technology, i.e. no specific components having doubled spare-part packages; expandability; additional flexibilization by introduction of further conveying criteria; higher performance possible than in the rigid operation mode known so far having velocities fixedly set (once); shorter daily operation times during normal operation; high investment security by adaptation to permanently changing requirements (unpredictable ordering behavior of the customers, market developments, peaks due to special offers, etc.); smart control by the material-flow computer which manages the active pool of (transport) orders and which is responsible for the control of the conveying lines; and/or an increased outage safety (redundancy) because each conveying line can take over the task(s) of the outage ones.

Further, preferably one of the transport paths is selected, by the control device, for each of the conveying goods based on the conveying criteria such that the throughput of the conveying goods through the conveying network is optimized during the time frame.

The conveying goods can be routed individually through the conveying network, particularly in a throughput-optimized manner. Each conveying good can take a different path through the network. Multiple possibilities are open to each of the conveying goods so that a high flexibility for the scheduling of all transport orders is present overall.

In particular, the selection of the operation modes for the transport paths on the one hand and the selection of the transport paths for the transport orders on the other hand are independent from each other, and are performed in a throughput-optimized manner.

With an additional advantageous embodiment each of the transport paths comprises one or more conveying lines being connected to each other, which connect the respective entry station to the associated exit station.

It is expressed here that arbitrarily many transport paths can be created, whereby the optimization process can be implemented easier.

In particular, each of the transport orders is defined by: the conveying criterion being allocated to the respectively allocated conveying good; the time frame; a spatial starting point which corresponds in particular to one of the entry stations; a spatial arrival point which corresponds in particular to one of the exit stations; one of the operation-mode phases during which transport of the respectively allocated conveying good starts at the starting point and ends at the arrival point; and one of the transport paths connecting the starting point to the arrival point.

Preferably, the one transport path includes only conveying lines operation modes of which are allocated during the associated operation-mode phase to the same conveying criterion like the respective transport order.

The associated conveying criterion is decisive for the selection of the transport paths and the velocities at which the transport paths, or the corresponding conveying lines, are operated.

Further, it is an advantage if the conveying network comprises a plurality of entry stations and/or a plurality of exit stations, wherein each of the entry stations is connectable to at least one exit station via several ones of the transport paths.

As a rule, a system comprises multiple sources and sinks. This increases the complexity of the system. Nevertheless, throughput optimization is possible.

Further, it is preferred that the control device optimizes the throughput determining, by means of the control device, preferably a distribution of the conveying criteria overall transport orders which are located temporally within the time frame, in order to select subsequently the operation modes for each of the transport paths based on the distribution.

Preferably, an additional operation mode being independent from conveying criteria is provided, which comprises a transport-path velocity of zero such that the corresponding transport path is in a resting state.

If some of the conveying lines are not needed for achieving the desired throughput they can be turned off. Thereby wear is reduced. Maintenance is less frequently required. Costs can be saved.

In particular, the control device takes into account during optimization a conveying-line specific maximum capacity in terms of a minimum distance of conveying goods.

Further, the object is solved by a method for transporting conveying goods dependent on a conveying criterion being allocated to each of the conveying goods in accordance with transport orders through a conveying system including a conveying network connecting an entry station via several transport paths to an exit station, and a control device, comprising the steps of: analyzing the transport orders, which are in a time frame including a plurality of subsequent operation-mode phases, for conveying criteria being allocated thereto, and determining a distribution of the conveying criteria being allocated to the transport orders; for each transport order: selecting one of the transport paths based on the respectively allocated conveying criterion such that throughput through the conveying network is optimal; and for each transport path: for each of the operation-mode phases being in the time frame, selecting one operation mode which defines in a conveying-criteria dependent manner a constant transport-path velocity based on the distribution of the conveying criteria such that the throughput through the conveying network is optimal.

It is clear that the above-mentioned and hereinafter still to be explained features cannot be used in the respectively given combination only but also in different combinations, or alone, without departing from the scope of the present invention.

Embodiments of the invention are illustrated in the drawings and will be explained in more detail in the following description.

The present invention relates generally to a modularly structured conveying system 10 where conveying goods, in particular piece goods, 34 (FIG. 5) are conveyed with or without load supports (not shown) in a driven transport and conveying network 12 via conveying lines 24 thereof (FIG. 3) from one station to another station.

Preferably, steady conveyers are employed for the conveying lines 24. Steady conveyers are (in-house) conveyors ensuring a continuous transport stream along a course of lines, which are set in advance, across a limited distance. The conveying good 34 can be moved steady, or in cycles, between involved stations 16, 18, and, if necessary, 22 (cf. FIG. 3) being connected by the conveying lines 24. The conveying goods 34 are in steady (i.e. permanent) motion. Exemplary steady conveyers are: roller conveyors, overhead conveyors, belt conveyors, chain conveyors, and the like.

Figure 6:
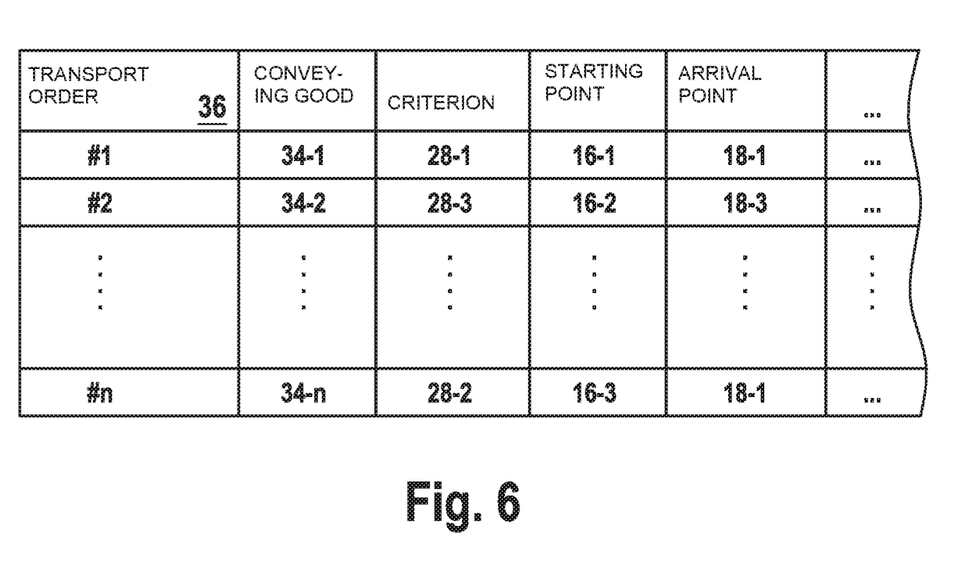
FIG. 6 shows an illustration of an exemplary allocation of conveying goods and associated conveying criteria thereof to transport orders.

The movements of the conveying goods 34 within the transport and conveying system 10 is triggered by conveying-good-specific transport orders 36 (cf. FIG. 6). The transport orders 36 can determine the retrieval and starting times when the conveying goods 34 are to be taken over at retrieval locations, or start points, and until which arrival time the conveying goods 34 are to be delivered to their respective destination locations and arrival points.

Additional transportation requirements (e.g., acceleration permissible at maximum, conveying-line ascent permissible at maximum, descent permissible at maximum, etc.) which can be recorded additionally for each transport order 36 can result from, for example, sensitivity or fragility of the conveying good 34.

Figure 2:
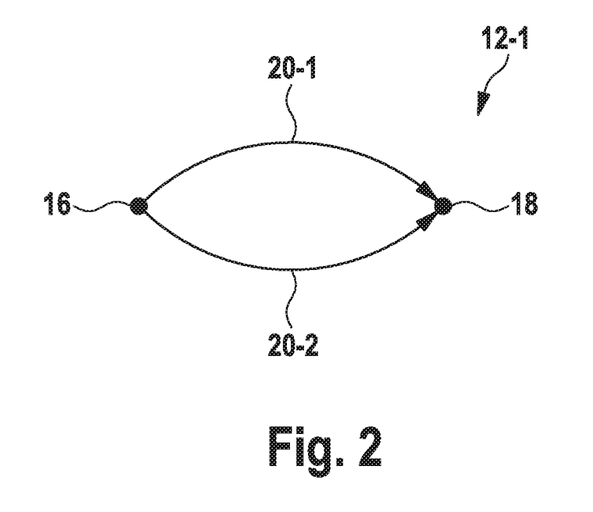
FIG. 2 shows an illustration of an exemplary conveying network.

A conveying demand, which is also called throughput, is defined by a number of transport orders 34 per unit of time between entry stations 16 and exit stations 18 (cf. FIG. 2). The conveying-goods occurrence results from the conveying demand. The conveying-goods occurrence corresponds to a number of conveying goods 34 which are be conveyed per unit of time between the stations 16 and 18.

The conveying lines 24 form a transport and conveying network 12 between the stations 16, 18 and 22, and particularly between the entry stations 16 and the exit stations 18. Streams of conveying goods 34 flow through the conveying network 12, which streams are routed by a control device 14 (FIG. 1) through the corresponding network such that the preset transport orders 34 are fulfilled.

If the stations 16, 18 and 22 are already connected to each other by a fixed network 12, the transport task can be seen in performing the transport orders 36 at hand within required transport times at costs as low as possible.

The network has a line, ring, and/or star structure, dependent on the arrangement and association of the stations 16, 18 and 22 via the conveying lines 24.

Figure 1:
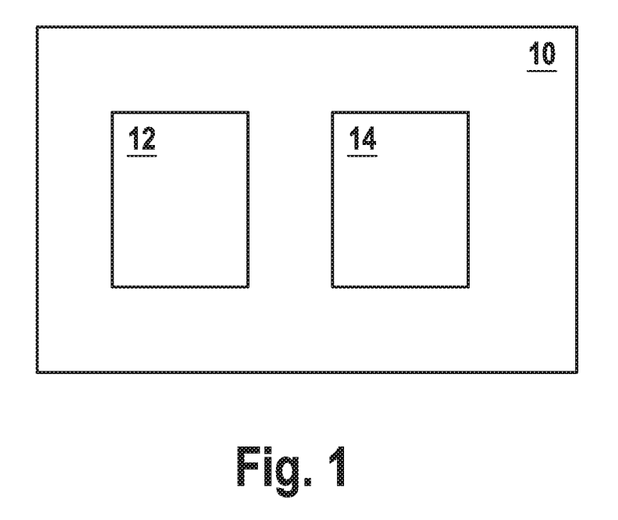
FIG. 1 shows a block diagram of a conveying system.

FIG. 1 shows a schematic block diagram of the conveying system 10 in accordance with the invention.

The conveying system 10 comprises the conveying network 12 which has the functionality of a transportation network. Further, the system 10 comprises the control device 14 configured to perform optimization processes for the transport orders 34 dependent on conveying criteria 28 (FIG. 4), in order to control the conveying lines 24 of the conveying network 12 in an optimized manner with regard to a (conveying) velocity 30 (cf. FIG. 4), as will be explained in more detail below. The control device 14 can be implemented in terms of hardware and/or software. The control device 14 can include, for example, a material-flow computer which is configured particularly for controlling the conveying velocities of the conveying lines 24 in all operation-mode phases 38 (FIG. 8) which form in common a time frame in which the transport orders 36 of the conveying goods 34 are.

FIG. 2 shows a schematic illustration of a very simple structured first conveying network 12-1. In general, it is true that each conveying network 12 comprises at least one entry station 16 and at least one exit station 18 connected to each other (respectively) via several different transport paths 20. The entry stations 16 represent sources of a material, or conveying-good, flow where the conveying good 34 (not shown) enters the conveying network 12. The exit stations 18 are sinks where the conveying goods 34 exit.

The conveying network 12-1 of FIG. 2 exemplarily comprises one single entry station 16 and one single exit station 18 connected to each other, for example, by two transport paths 20-1 and 20-2. One conveying good (not illustrated) which is to be transported from the entry station 16 to the exit station 18 can thus be transported via several different transport paths 20, in the present case via the transport paths 20-1 and 20-2, to the exit station 18. It is clear that more than two different transport paths 20 can be provided for each pair of entry station and exit station.

In the conveying network 12-1 of FIG. 2 each of the transport paths 20-1 and 20-2 is respectively formed by only one single conveying line 24. The transport paths 20 can be formed, in general, by one or more connected conveying lines 24, as will be explained in more detail with reference to FIG. 3.

Figure 3:
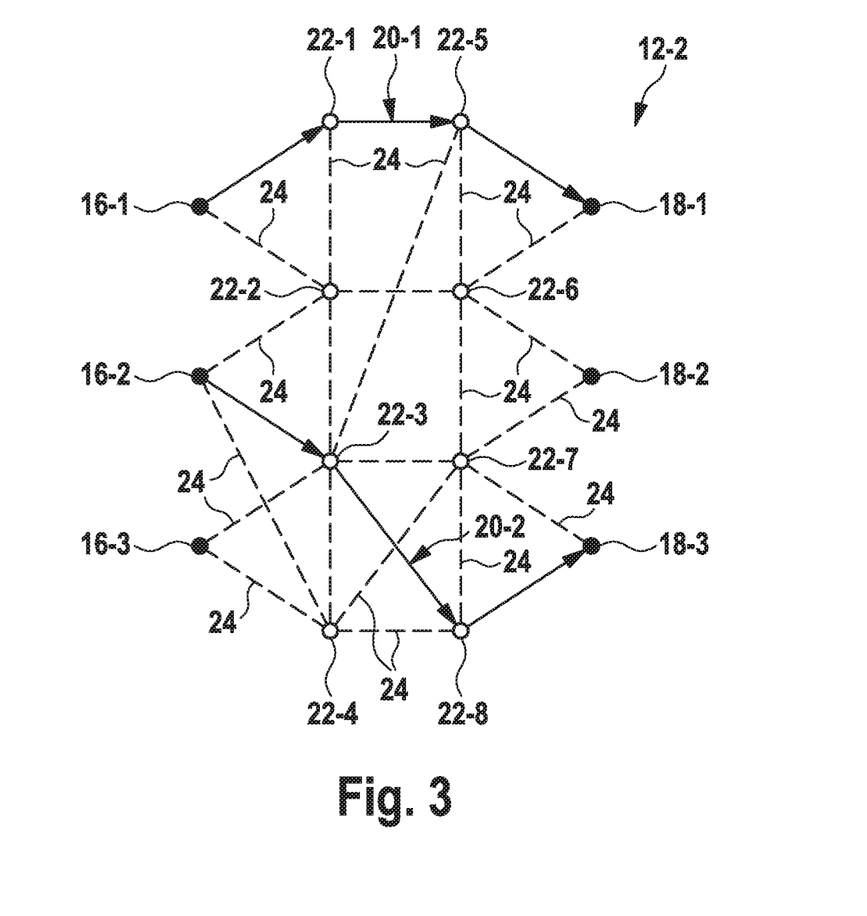
FIG. 3 shows a schematic illustration of a complex conveying network.

FIG. 3 shows a schematic illustration of a modified second conveying network 12-2 comprising a higher degree of complexity than the simple conveying network 12-1 of FIG. 2.

The conveying network 12-2 of FIG. 3 comprises several entry stations 16, several exit stations 18, as well as respectively several (possible) transport paths 20 between the entry stations 16 and exit stations 18, which are respectively composed of several conveying lines 24. In FIG. 3 two (possible) transport paths 20-1 and 20-2 are exemplarily depicted in highlighted manner by respectively one solid line.

The conveying network 12-2 of FIG. 3 further comprises several (optional) nodes in terms of intermediate stations 22 being arranged between the entry stations 16 and the exit stations 18 with regard to the conveying-goods flow.

In FIG. 3 eight nodes 22-1 to 22-8 are exemplarily shown. The nodes 22 are connected between each other and to the stations 16 and 18 via the conveying lines 24 indicated in FIG. 3 by means of dashed lines. The conveying lines 24 can connect arbitrary nodes 22 to each other.

The conveying lines 24 generally represent, besides the stations 16 and 18 as well as the optional nodes 22, elementary components of conveying networks 12. It is clear that the conveying networks 12 can generally comprise one, several (FIG. 3) or no node 22 (FIG. 2).

In general, the conveying lines 24 can be equipped with one or no logistic function. A sorting device, which can be implemented exemplarily by a closed conveyor, is an example of a conveying line 24 having a logistic function. A linear conveyor connecting to each other, e.g., two nodes 22 along a shortest path represents a conveying line 24 without a logistic function.

It is clear that in general the conveying lines 24 can be implemented by each conveyor type or by a concatenation of identical or different conveyor types. Exemplary conveyor types are: roller conveyors, belt conveyors, overhead conveyors, chain conveyors, and the like. The conveying lines 24 are implemented preferably as steady conveyors.

In FIG. 3 the transport path 20-1 connects the entry station 16-1 to the exit station 18-1.

The transport path 20-2 connects the entry station 16-2 to the exit station 18-3. Each of the transport paths 20-1 and 20-2 is respectively formed by three conveying lines 24. In general, one transport path 20 can be formed of one or more conveying lines 24.

The transport path 20-1 of FIG. 3 is formed by the conveying lines 24 connecting the entry station 16-1 to the node 22-1, the node 22-1 to the node 22-5, and the node 22-5 to the exit station 18-1. These conveying lines 24 are coupled subsequently to each other, and couple the entry station 16-1 to the exit station 18-1.

Similar is true for the transport path 20-2 of FIG. 3 which is also formed by three conveying lines 24, namely by the conveying lines 24 connecting the entry station 16-2 to the node 22-3, the node 22-3 to the node 22-8, and the node 22-8 to the exit station 18-3. These three conveying lines 24 couple the entry station 16-2 to the exit station 18-3.

It is clear that the entry station 16 and exit station 18 are also connectable to each other via different transport paths 20 being not illustrated in FIG. 3, but which are possible. The entry station 16-1 could be connected alternatively to the exit station 18-1 via the conveying lines 24 connecting the entry station 16-1 to the node 22-2, the node 22-2 to the node 22-6, and the node 22-6 to the exit station 18-1.

In general, it is further true that each of the conveying lines 24 can be operated in a plurality of different operation modes 26 for a predetermined period of time (operation-mode phase 38, FIG. 8). The conveying lines 24, and thus even the transport paths 20, are configured for being switched almost immediately by the control device 14, for example, based on a corresponding control signal (not shown) from one of the operation modes 26 to a different one of the operation modes 26.

The switching results in a change of the velocity 30 at which the corresponding conveying lines 24 are operated constantly for the next phase 38. The switching typically is performed automatically. The switching is also performed dynamically, namely dependent on properties, or criteria 28 of the conveying goods 34, as will be explained in more detail below with reference to the FIGS. 4 and 5.

It is clear that the tables shown below can be recorded respectively in terms of a corresponding data set in the control device 14 and can be processed by the control unit 14.

Figure 4:
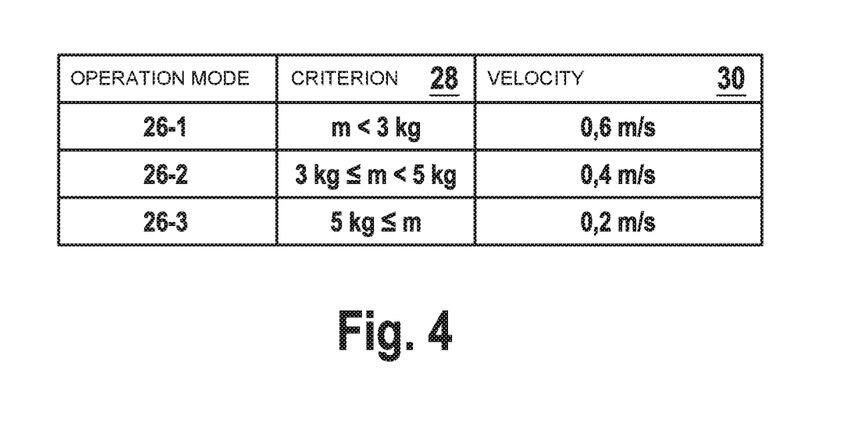
FIG. 4 shows an illustration of an exemplary allocation of transport-path, or conveying-line, operation modes to conveying criteria and transport-path, or conveying-line, velocities.

FIG. 4 shows a table for illustrating, for example, three different operation modes 26-1 to 26-3. It is clear that, in general, at least two different operation modes 26 exist in accordance with which the transport paths 20, or the conveying lines 24, can be operated. The operation modes 26 are substantially distinguish in their associated velocity 30 at which the transport path 20, or the connected conveying lines 24, can be operated for the duration of one operation-mode phase 38.

In accordance with FIG. 4 all conveying lines 24, which are operated in the first operation mode 26-1, are exemplarily operated at a first constant velocity of 0.6 m per second. All conveying lines 24 operated in the second operation mode 26-2 are operated at a constant conveying velocity of 0.4 m per second. All conveying lines 24, which are operated in the operation mode 26-3, are operated at a constant conveying velocity of 0.2 m per second.

A conveyor-good criterion 28 is decisive for the different operation mode 26 in which each of the conveying lines 24 is operated.

The operation mode 26-1 is selected, for example, when a conveying good 34 which is to be transported has a mass m which is, for example, less than 3 kg corresponding to the first conveyor-good criterion 28-1. The operation mode 26-2 is selected when the mass m of the conveying good 34 is equal to or greater than 3 kg, but less than 5 kg, corresponding to the second conveyor-good criterion 28-2. The third operation mode 26-3 is selected when the mass m of the conveying good 34 is equal to or greater than 5 kg corresponding to the third conveyor-good criterion 28-3.

It is clear that the mass m of the conveying good is only an exemplary property of the conveying good 34 which determines the (conveying) criterion 28. Alternatively, for example, volume, dimension, fragility, or the like of the conveying good 34 is selected for defining the criteria 28.

Further, it is clear that the range limits which are shown in FIG. 4 for the mass m are only of an exemplary nature. The range limits can be selected in general arbitrarily, and are to be defined, for example, by the maximum individual load (cf. introduction). This applies analogously for the velocities 30 allocated to the respective criterion 28 and to the respective operation mode 26.

In general, it is true that one conveying criterion 28 and one velocity 30 are respectively allocated to each of the operation mode 26.

Figure 5:
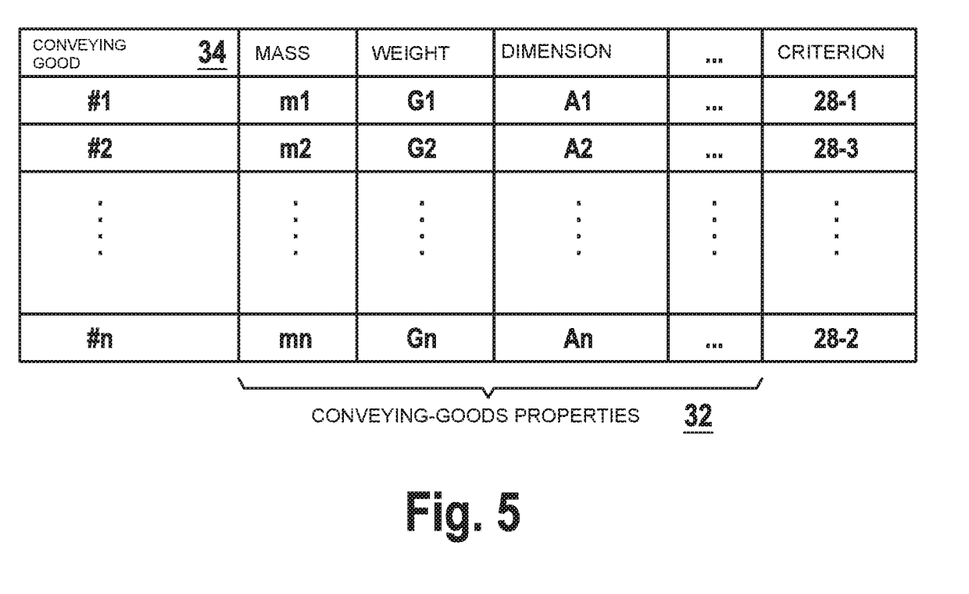
FIG. 5 shows an illustration of an exemplary allocation of conveying goods to the conveying criteria of FIG. 3 dependent on associated conveying-good properties.

FIG. 5 shows a table for illustrating conveying-good properties 32 and an exemplarily classification or allocation, which results from the properties 32, for n conveying goods 34 to the three conveying-good criteria 28-1 to 28-3 of FIG. 4.

In FIG. 5 the conveying good 34-1 has a mass m1 (e.g., 2 kg), a weight G1, a dimension A1, and so on. Since the mass m1 is 2 kg and since the conveying velocity 30 is dependent from the mass m in accordance with the FIG. 4, the conveying criterion 28-1 is allocated to the conveying good 34-1. This means that the conveying good 34-1 is allowed to be transported at a conveying velocity 30 of 0.6 m per second (at maximum) via the conveying lines 24.

If one assumes that the mass m2 of the conveying good 34-2 is, for example, 8 kg, this explains the allocation of the conveying criterion 28-3 to the conveying good 34-2. This means that the conveying good 34-2 is allowed to be transported at a maximum velocity of 0.2 m per second. However, this excludes that the conveying good 34-2 may also be transported at a higher conveying velocity 30, such as 0.6 m per second (operation mode 26-1 or criterion 28-1) or 0.4 m per second (operation mode 26-2 or criterion 28-2).

If one assumes that the conveying good 34-$n$ has a mass m of, for example, 4 kg, this explains the allocation of the conveying criterion 28-2 to the conveyor good 34-$n$. This means that the conveyor good 34-*n* is to be transported at a conveying velocity 30 of 0.4 m per second (at maximum), wherein it is not excluded that the conveying good 34-*n* is also transported at the conveying velocity 30 of 0.2 m per second in accordance with the conveying criterion 28-3 (additional degree of freedom for the optimization process).

The control device 14 is generally configured such that respectively one of the conveying criteria 28, and thus also one preferred conveying velocity 30, is allocated to each conveying good 34 which is to be transported within a predetermined time frame (such as within 10 hours) through the conveying network 12.

The above-mentioned time frame defines the temporal limits for transport orders 36 which can be considered during the optimization.

The control device 14 is configured to specify the operation modes 26 for the available conveying lines 24 of the respective conveying network 12 as well as—dependent thereon—the transport paths 20 for respectively one (entire) time frame, in particular in a throughput-optimized manner.

The duration of the time frame is less than one day (24 hours), in particular when a business model (e.g., e-commerce), on which the conveying system 10 is based, requires transporting (i.e. order picking and shipping) the conveying goods 34 within one day.

The time frame could also include several hours. The operation modes 26 could respectively last, for example, 30 minutes or one hour (operation-mode phase 28) so that each of the conveying lines 24 could change its operation mode 26 (i.e. the conveying velocity) within the time frame several times (i.e. dynamically) if this is required for the optimization of the throughput.

It is clear that the amounts mentioned here for the time frame and operation modes 26 are of an exemplary nature only. In general it is true that the duration of the time frame is equal to or greater than the duration of one operation mode 26, wherein in particular all operation modes 26 last identically.

It goes without saying that it is also possible that the operation-mode phases 38 can have different lengths, wherein the sum of the phases, however, yields the time frame. This is shown in FIG. 8B where the respective duration of the phases 38 is additionally marked. The first phase 38-1 lasts, for example, 60 min. The second phase lasts, for example, 8 min and so on. The sum of the phases 38, however, is respectively 600 min.

Moreover, the time frame represents a further conveying-good property 32 which is not depicted in the table of FIG. 5. The time frame determines roughly when the respective conveying good 34 is to be transported in the conveying network 12.

With reference to FIG. 6 an exemplary table for illustrating the transport orders 36 is shown.

One of the conveying goods 34 is allocated (exactly) to each transport order 36, and vice versa. The same is true for the conveying criterion 28 being allocated to the transport order 36 via the respective conveying good 34.

Further, each transport order 36 comprises a starting point and an arrival point within the conveying network 12. The starting point is defined (spatially) by one of the entry stations 16. The arrival point is defined (spatially) by one of the exit stations 18.

Furthermore, the time frame (not shown in FIG. 6) is allocated to each transport order 36, which time frame in turn is allocated to the corresponding conveying good 34 (and vice versa), as explained above.

Further, a starting time (not shown) and/or an arrival time (not shown) can be allocated further to each transport order 36, and thus also to each conveying good 34. In particular, the arrival time can be of a specific significance. allow Different conveying goods 34, which can originate from different sources, can be merged spatially and temporally at one location (i.e. at the allocated exit station 18) by means of the arrival time (and the exit station).

This can be important for order-picking systems (not shown) which have the system 10 integrated and where different conveying goods 34, which all belong to one customer order or picking order (not shown), must to arrive at the exit station 18 almost at the same time for being packed, for example, into the same package which is shipped subsequently to the customer who has ordered the corresponding (conveying) goods. This synchronization is even more important if the order-picking system is operated in a so-called batch operation.

Returning to FIG. 6 the transport order 36-1 is allocated to the conveying good 34-1, and thus to the conveying criterion 28-1. The transport order 36-1 starts, for example, at the entry station 16-1 and ends, for example, at the exit station 18-1. The transport order 36-2 is allocated to the conveying good 34-2. Thus, the transport order 36-2 is allocated to the conveying criterion 28-3. The transport order 36-2 can start, for example, from the entry station 16-2 and end at the exit station 18-3.

Since respectively one of transport orders 36 is allocated to each of the n conveying goods 34 (and vice versa) the table of FIG. 6 also includes n transport orders 36.

Figure 7:
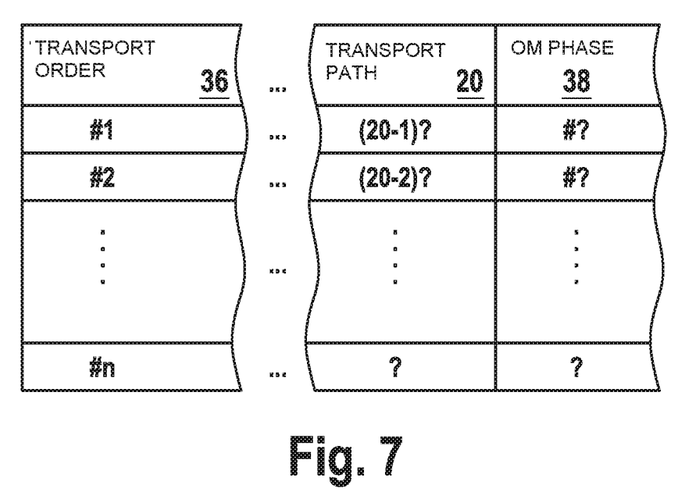
FIG. 7 shows an illustration of an exemplary allocation of the transport orders of FIG. 6 to transport paths and operation-mode phases.

FIG. 7 represents a continuation of the table of transport orders 36 of FIG. 6. FIG. 7 serves for illustrating a partial aspect of the throughput optimization. This partial aspect is expressed in that one transport path 20, or a chain of conveying lines 24 (cf. FIG. 3), is selected for each of the transport orders 36, which transport path 20 has to be in the right operation mode 26 at the preset time (transport time of the conveying good 34), wherein the operation mode 26 in turn is preset by the conveying criterion 28. Hence, this means that the selected transport path 20 needs to be in a suitable operation mode 26 at the time of transport.

If the transport path 20 is not in the suitable operation mode 26, such as during a first phase 38, it could possibly be in the suitable mode 26, however, in the second phase 28. This is derivable from the table of FIG. 8 which will be explained in more detail below.

Figure 8A:
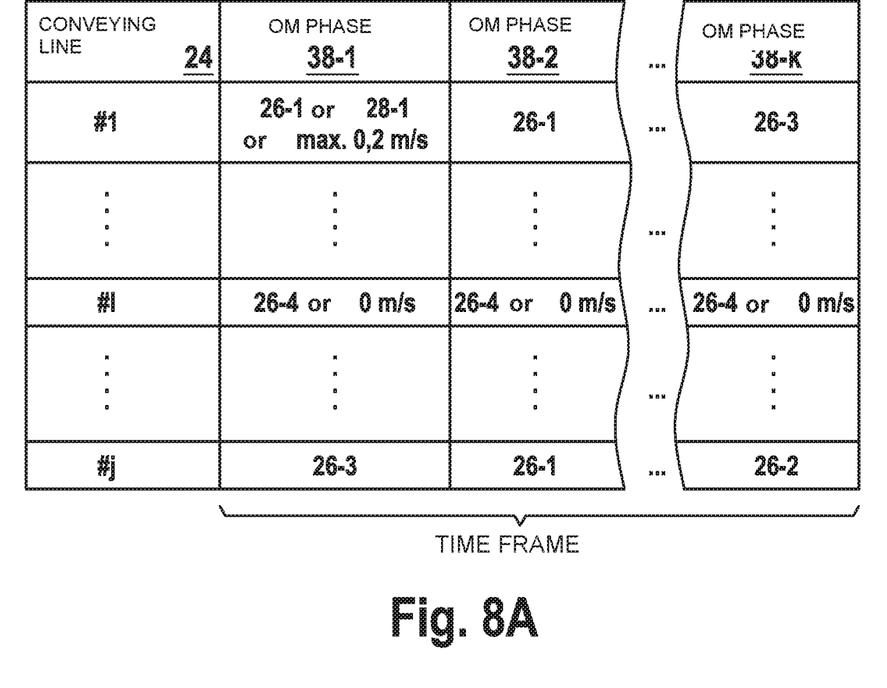
FIG. 8 shows an illustration of an exemplary allocation of the conveying lines, or the transport paths formed therefrom, to the operation-mode phases, or the corresponding conveying criteria, which in turn correspond to conveying velocities.
Figure 8B:
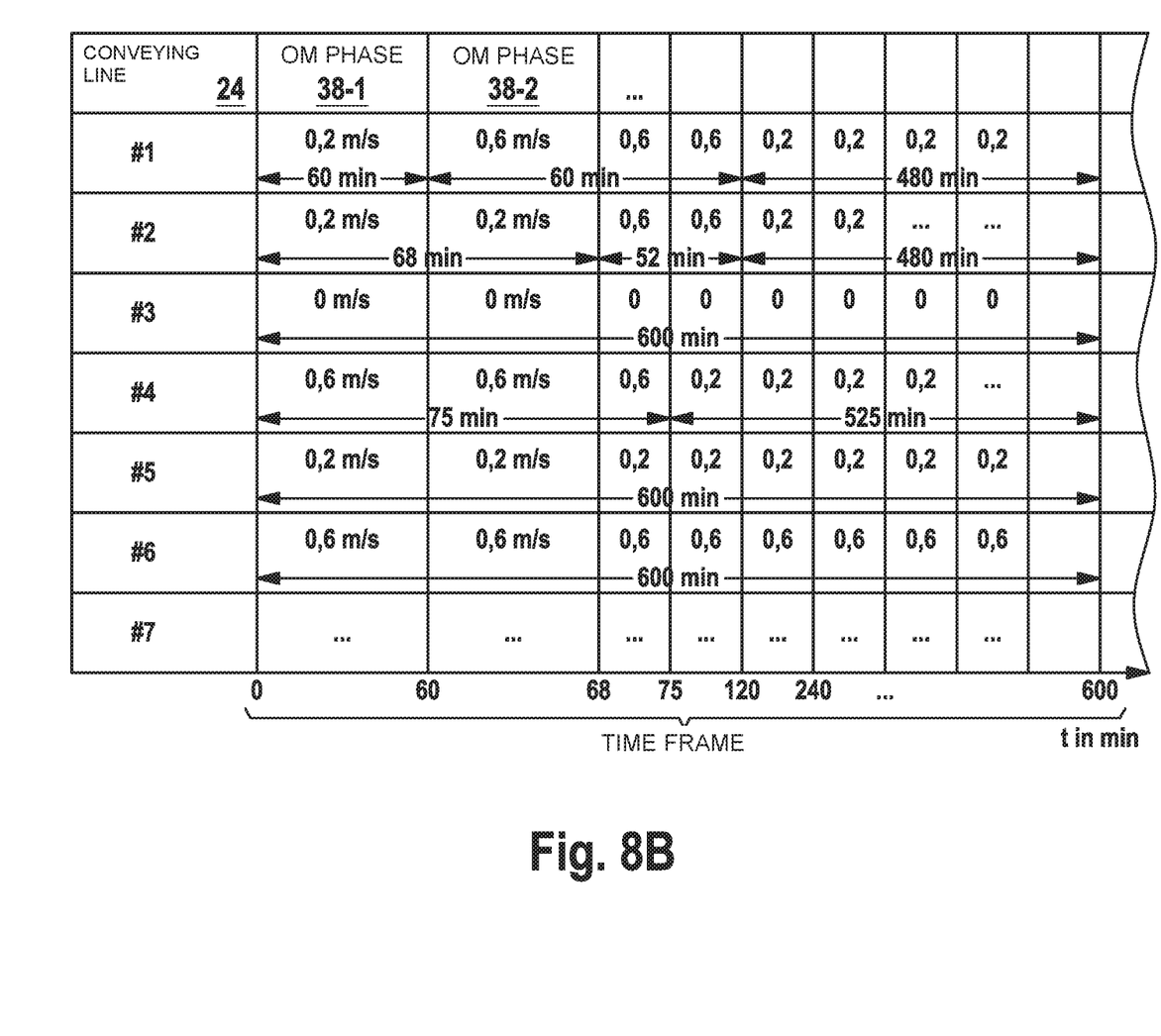

A further aspect of the throughput optimization is illustrated in the table of FIG. 8A. FIG. 8A shows an exemplary allocation of j conveying lines 24-1 to 24-*j* to the three operation modes 26-1 to 26-3 (cf. FIG. 4) for each of k operation-mode phases 38-1 to 38-*k*, provided that the time frame is divided into k operation-mode phases 38. With other words, this means that the control device 14 needs to select for each of the conveying lines 24 one of the operation modes 26 for each of the k operation-mode phases 38. This selection is performed dependent on the conveying-good criterion 28 which in turn determines the conveying velocity 30 of the respective conveying line 24.

The selection processes of FIGS. 7 and 8A dependent on each other. In particular, they are part of the throughput optimization.

The throughput optimization has the general goal of transporting as much as possible conveying goods 34 within a time as short as possible (preferably less than the time frame) utilizing as few as possible conveying lines 24 and considering the conveying criterion 28 from the respective starting point to the respective arrival point through the conveying network 12.

In FIG. 8A one of three operation modes 26 for each of the k operation-mode phases 38 has already been allocated by the control device 14 due to the throughput-optimized selection method to each of the j conveying lines 24. This allocation is based on a distribution of the conveying criteria 28 over all transport orders 36 falling into the relevant time frame.

Figure 9:
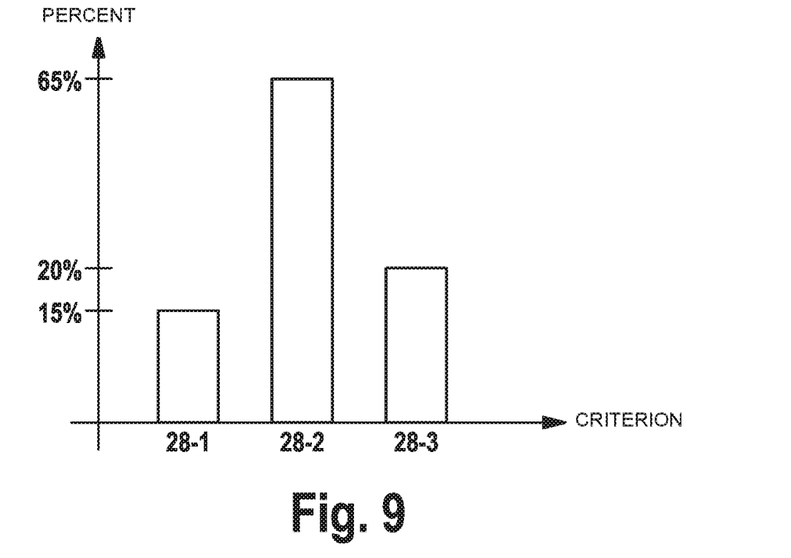
FIG. 9 shows on a percentage-based distribution of the conveying criteria being allocated to all transport orders of one time frame.

FIG. 9 exemplarily illustrates that 15% of the n transport orders 36 (cf. FIG. 6), or of the n conveying goods (cf. FIG. 5), comprise the first conveying criterion 28-1. The conveying criterion 28-2 has been allocated by the control device 14 to 65% of the conveying goods 34, and thus also to 65% of the transport orders 36. The third conveying criterion 28-3 has been allocated by the control device 14 to 20% of the conveying goods 34 and the transport orders 36.

With other words, this means that 15% of the conveying goods 34 may be transported at a velocity 30 of 0.6 m per second at maximum, 65% of the conveying goods 34 may be transported at a maximum conveying velocity 30 of 0.4 m per second, and 15% of the conveying goods 34, or of the transport orders 36, may be transported at a maximum conveying velocity 30 of 0.2 m per second.

FIG. 8 reflects an (already conducted) exemplary allocation of the operation modes 26 to the conveying lines 24 for the respective operation-mode phases 38 based on the distribution of FIG. 9.

The allocation of the transport paths 20 and the associated transport times, or operation-mode phases 38, to the transport orders 36 is not yet fully completed in FIG. 7. However, if the optimization process is completely passed, one of the possible transport paths 20 and one corresponding operation-mode phase 38 are allocated to each of the transport orders 36 in FIG. 7.

Further, it can be considered additionally that different ones of the n conveying goods 34 have to arrive almost at the same time at one of the exit stations 16. For example, this is the case when one customer order comprises two or more conveying goods 34, wherein a different conveyor-good criterion 28 can be allocated to each of the conveying goods 34. The customer could have ordered, for example, a book (light, criterion 28-1) and a microwave (heavy, criterion 28-3) which are then to be shipped together in one package to the customer. In this case the corresponding exit station 18 could be implemented by a packing robot (not shown), the entry stations 16 could represent different storage locations, and the transport paths 20 could be implemented by a roller conveyor (not shown) for the microwave and by an overhead conveyor, including pockets as transporting means (not shown) and a pocket sorter, for the book.

In the following, the differences between the prior art and the present concept will be explained once more.

In the prior art the conveying lines 24, as mentioned above, could be operated, for example, at a conveying velocity 30 of 0.556 m per second with a maximum line load of 10 kg per meter and a maximum individual load of 4.5 kg, or alternatively at a second conveying velocity 30 of 0.278 m per second with a maximum line load of 25 kg per meter and a maximum individual load of 12.5 kg. If conveying goods 34 having a mass of 0.1 to 12.5 kg have to be transported through the conveying network 12 the configuration and parameterization of the conveying lines 24 was conducted in the prior art considering the highest possible stress, because it was generally not predictable which of the operation parameters (conveying velocity) could have been (manually) changed individually at each module at a certain time. It was not predictable when and where which one of the conveying goods occurs.

Thus, in this case each the conveying lines 24 needed to be operated, due to the biggest individual load of 12.5 kg, at a maximum velocity of 0.278 m per second. Since the line load of 25 kg per meter had to be observed additionally, the minimum distance of conveying goods (smallest separation T possible) was 0.5 m. Thus, each of the conveying lines 24 was capable of transporting scarcely 2000 conveying goods in one hour (product of velocity and 3600 seconds divided by distance of conveying goods). Hence, the throughput of each of the conveying lines was 2000 conveying goods per hour at maximum. If in this situation 380,000 pieces had to be transported within an operation time of 10 hours, 19 conveying lines were required.

As an alternative to the above-described prior art, the present invention divides the conveying goods 34, which still comprise individual masses of 0.1 to 12.5 kg, into three groups, or conveying criteria, 28-1 to 28-3 (28-1: <2 kg; 28-2: 2 kg-4.5 kg; 28-3: 4.5 kg-12.5 kg). These three conveying criteria 28 result in three different operation modes 26-1 to 26-3 (26-1: 0.556 m per second, T=0.2 m, throughput=10,000 pieces per hour; 26-2: 0.556 m per second, T=0.445 m, throughput=4500 pieces per hour; 26-3: 0.278 m per second, T=0.5 m, throughput=2000 pieces per hour).

The control device 14 associated with the conveying network 12 evaluates the present transport orders 36 and sets the operation modes 26 correspondingly for the conveying lines 24. The setting is based on the distribution of the conveying criteria (cf. FIG. 9).

It is easy to understand that with this setting the reaching of an overall throughput of, for example, 380,000 pieces in 10 hours can be achieved. In a first time period of 2 hours, for example, six transport paths 20, or conveying lines 24 in the example of FIG. 3, could be configured such that two transport paths 20 are operated in the first operation mode 26-1, two transport paths 20 in the second operation mode 26-2, and two transport paths 20 in the third operation mode 26-3, so that in this time period 66,000 conveying goods (=2×(2×10,000+2×4500+2×2000)) are conveyed. In the second time period of 7 hours the six transport paths 20 can be configured such that four of the transport paths 20 are operated in the operation mode 26-1 and two of the transport paths 20 in the operation mode 26-3 so that in this second time period of 7 hours 308,000 conveying goods (=7×(4× 10,000+2×2000)) could be conveyed in total. In the third time period of one hour (note: sum of all three time portions is 10 hours) the six transport paths 20 may be configured such that all six transport paths 20 are operated in the third operation mode 26-3 so that in the third time period 12,000 conveying goods (=1×6×2000) are conveyed. Thus, in total 386,000 articles would be transported in 10 hours by means of only six conveying lines. The prior art required 19 conveying lines for this.

This example illustrates that the present concept represents a significant improvement over the prior art. With the present concept it is possible to operate existing conveying systems 10 either more efficient because a higher throughput (number of conveying goods per unit of time) can be achieved with a fixedly given number of conveying lines 24. Alternatively, the same throughput can be achieved with fewer conveying lines 24, since fewer conveying lines are already sufficient for achieving the same throughput. This results in a reduced wear and thus in reduced maintenance cycles, or in a resting state of the remaining 13 conveying lines.

When new conveying systems 10 are designed throughputs can be considered during the dimensioning of the conveying systems 10 which are expected in the future only. In this context the operator of the conveying system 10 has the choice either to install immediately a corresponding number of conveying lines 24 (for the throughput expected in the future) which are then operated with corresponding less wear, or to install fewer conveying lines 24 (at corresponding less investment costs), wherein, however, the later scalability of the desired throughput for the future has already been considered.

As a further measure the frame, which is temporally fixed with regard to its length, can migrate over time with the present invention. This means, for example, that a first time frame for transport orders is processed in a throughput-optimized manner, which transport orders have been received between midnight and 10 a.m. A second time frame (von 10 hours) could be processed for transport orders received between 10 a.m. and 8 p.m. It is clear that the time frames may also overlap so that the second frame is already started at 6 a.m., wherein some transport orders 36 in this case belong to both the first and second frame.

As an alternative to the approach which uses the time frames, the invention can also be configured such that always a predetermined number of transport orders is processed simultaneously. In this case, the system 10 can be configured, for example, such that always 60,000 transport orders can be processed at maximum and executed simultaneously in a throughput-optimized manner. If after a certain time phase (e.g., 10 minutes) some of the original transport orders are processed and executed, the amount of transport orders permissible at maximum could be re-added by a corresponding amount corresponding to the amount of the transport orders processed.

In both of the lately discussed cases one also speaks of "wave picking".

Figure 10:
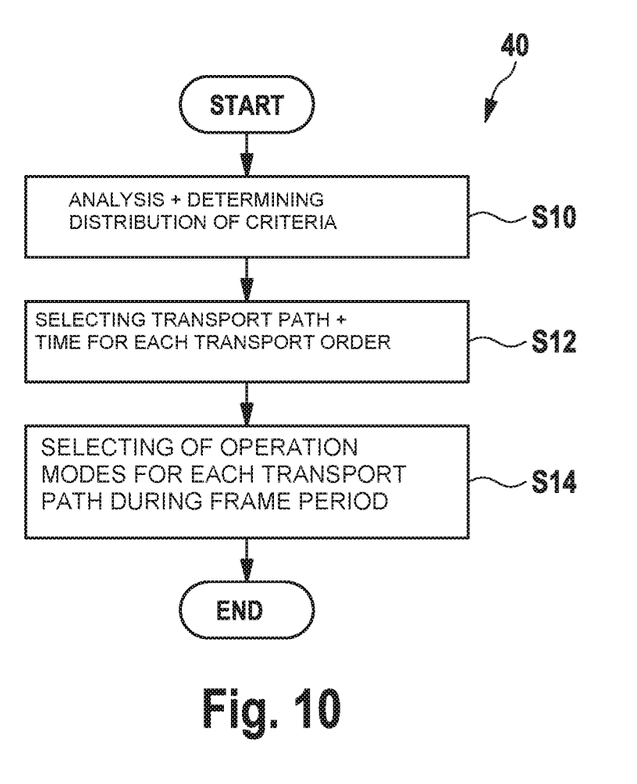
FIG. 10 shows a flow chart of a method for operating a conveying system.

FIG. 10 shows a method 40 for operating the conveying system 10 in order to transport the conveying goods 34 through the conveying network 12 dependent on their conveying criteria 28 in accordance with the transport orders 36.

The method 40 includes analyzing (step S10) the transport orders 36 within the time frame, which comprises a plurality of subsequent operation-mode phases 38, for the conveying criteria 28 allocated thereto, as well as determining the distribution of the conveying criteria 28 (cf. FIG. 9) being allocated to the transport orders 36.

Further, the method 40 includes a step S12 where for each transport order 36 respectively one of the transport paths 20 (i.e. a chain of conveying lines 24) and an associated transport time (i.e. one or more operation-mode phases 38) are selected based on the respectively allocated conveying criterion 28, so that the throughput through the conveying network 12 is optimal.

Finally, the method 40 includes a step S14 wherein for each transport path 20 and each operation-mode phase 38 within the time frame one operation mode 26 is selected which defines, dependent on the conveying-criterion, a constant transport-path velocity, or conveying-line velocity 30, wherein the selection is conducted based on the distribution of the conveying criteria 28 so that the throughput through the conveying network 10 is optimal.

The present consideration is based on the idea that the time frame (e.g., 10 hours) moves together with the system-operation duration (e.g., 6 a.m. to 8 p.m., i.e. 14 hours). This means that the optimization time frame is less than the system-operation duration (per day). In this way, for example, a first system configuration for the duration from 6 a.m. to 4 p.m. could be determined at 6 a.m. At 6.30 a.m. a configuration could be determined for the period from 6.30 a.m. to 4.30 p.m.

Alternatively, the time frame (e.g., 10 hours) could also be set equal to the system-operation duration per day (e.g., 8 a.m. to 6 p.m.). In this case a cyclic (e.g., each 10 min) inquiry (not shown) could follow to the step S14 for inquiring whether new transport orders are present which were not present, or considered, in the first cycle yet. If such orders exist, the distribution (step S10) is re-determined (namely for the remaining time frame), and based thereon the selection steps (steps S12 and S14) are re-performed, which can result in a different system configuration (conveying velocity per line and phase) compared to the proceeding cycle. In this case it could also be considered that some orders of preceding cycles are already completed and therefore are no longer in the distribution of a new cycle.

Details of the method 40 result from the above already given explanation of the system 10.

Further, it is to be noted that both the system 10 and method 40 can be used in particular in the field of storage and order-picking systems being utilized for picking articles in the field of e-commerce. In order to be able to pick articles, the articles need to be transported through the storage and order-picking system. In this case the entry stations 16 could be implemented, for example, by storage locations within a warehouse. The intermediate stations 22 could be implemented by picking-work stations. The exit stations 18 could also be workstations, or could be implemented by a shipping area.

Further, the invention relates to further aspects expressed in the following clauses.

LIST OF REFERENCE NUMERALS

10 System
12 Conveying/transport net(work)
14 Control device
16 Entry station (source)
18 Exit station (sink)
20 Transport path
22 Node/station
24 Conveying line
26 Operation mode
28 Conveying-goods criterion
30 (Transport-path) velocity
32 Conveying-goods property
34 Conveying good
36 Transport order
38 Operation mode-(OM-) phase

The invention claimed is:

1. A conveying system including a conveying network and a control device for transporting through the conveying network a plurality of conveying goods in accordance with conveying-good specific transport orders during a time frame,
wherein one of several different conveying criteria and one of the transport orders are allocated to each of the conveying goods,
wherein the conveying network comprises an entry station, an exit station, and several transport paths,
wherein each of the transport paths connects the entry station to the exit station, wherein each of the transport paths is operable during each operation-mode phase in one of several different operation modes, wherein the operation modes distinguish from each other in constant transport-path velocities, wherein respectively one of the transport-path velocities is allocated to each of the operation modes based on one of the conveying criteria, and wherein the time frame is defined by several subsequent operation-mode phases, wherein the operation modes are selected, by the control device, for each of the transport paths based on the conveying criteria, which are allocated to the allocated conveying goods, respectively for one of the operation-mode phases such that throughput of the conveying goods through the conveying network is optimized during the time frame.

2. The conveying system of claim 1, wherein one of the transport paths is selected by the control device for each of the conveying goods based on the conveying criteria such that the throughput of the conveying goods through the conveying network is optimized during the time frame.

3. The conveying system of claim 2, wherein the selection of the operation modes for the transport paths and the selection of the transport paths for the transport orders are independent from each other, and are performed in a throughput-optimized manner.

4. The conveying system of claim 1, wherein each of the transport paths comprises one or more conveying lines being connected to each other, which connect the respective entry station to the associated exit station.

5. The conveying system of claim 1, wherein each of the transport orders is defined by:
the conveying criterion being allocated to the respectively allocated conveying good;
the time frame;
a spatial starting point;
a spatial arrival point;
one of the operation-mode phases, during which transportation of the respectively allocated conveying good starts at the starting point and ends at the arrival point; and
one of the transport paths connecting the starting point to the arrival point.

6. The conveying system of claim 5, wherein the one transport path only includes conveying lines, operation modes of which are allocated to the same conveying criterion as the respective transport order during the associated operation-mode phase.

7. The conveying system of claim 1, wherein the conveying network comprises a plurality of entry stations and/or a plurality of exit stations, wherein each of the entry stations is connectable to at least one of the exit station via several ones of the transport paths.

8. The conveying system of claim 1, wherein the control device optimizes the throughput by determining, by means of the control device, a distribution of the conveying criteria over all of the transport orders which are temporally within the time frame for selecting subsequently the operation modes for each of the transport paths based on the distribution.

9. The conveying system of claim 1, wherein an additional operation mode is provided which is independent from the conveying criteria and comprises a transport-path velocity of zero such that the corresponding transport path is in a resting state.

10. The conveying system of claim 1, wherein the control device takes into account, during optimization, a conveying-line specific maximum capacity in terms of a minimum distance of conveying goods.

11. A method for operating a conveyor system which comprises a conveying network connecting an entry station via several transport paths to an exit station, and a control device for transporting conveying goods dependent on conveying criteria thereof, which are allocated to each of the conveying goods, in accordance with transport orders through the conveying network, comprising the steps of:
analyzing the transport orders, which are in a time frame including a plurality of subsequent operation-mode phases, for the conveying criteria allocated thereto, and determining a distribution of the conveying criteria allocated to the transport orders; for each of the transport orders:
selecting one of the transport paths and an associated transport time based on the respectively allocated conveying criterion such that throughput through the conveying network is optimal; and
for each of the transport paths:
for each operation-mode phase being within the time frame, selecting one operation mode which defines a constant transport-path velocity in a conveying-criteria dependent manner based on the distribution of the conveying criteria such that the throughput through the conveying network is optimal.

12. The method of claim 11, wherein the control device generates corresponding control signals for operating the conveying lines at corresponding velocities during the respective operation-mode phases.

* * * * *